United States Patent [19]

Pavano

[11] Patent Number: 5,832,621
[45] Date of Patent: Nov. 10, 1998

[54] DIPSTICK LIGHT ASSEMBLY

[76] Inventor: Jon J. Pavano, 817 E. Palmyra, Orange, Calif. 92666

[21] Appl. No.: 912,530

[22] Filed: Aug. 18, 1997

[51] Int. Cl.⁶ ................................................. G01F 23/04
[52] U.S. Cl. .............................. 33/722; 362/109; 362/61; 362/253
[58] Field of Search .................... 33/722, 719, 721, 33/725, 726; 362/61, 109, 253

[56] References Cited

U.S. PATENT DOCUMENTS

| | | | |
|---|---|---|---|
| 2,127,042 | 8/1938 | Morrell | 33/722 |
| 2,354,853 | 8/1944 | Dobbs | 33/760 |
| 3,460,181 | 8/1969 | Denver | 33/726 |
| 4,580,347 | 4/1986 | McKnight | 33/760 |
| 4,947,476 | 8/1990 | Seaburg | 33/725 |

Primary Examiner—Christopher W. Fulton

[57] ABSTRACT

A dipstick light assembly adapted for use in association with a dipstick having a free upper end and a lower end including incremental fluid markings, the apparatus comprises a bracket formed in a generally semi-cylindrical configuration with a hollow interior, a front end, a rear end, a central section and an axis, the bracket including at least one downwardly extending ear, each ear having a central aperture extending therethrough, the ear of the bracket being coupled to the dipstick, the interior of the bracket including a bulb and a battery compartment with batteries coupled therein, the batteries being in electrical communication with the bulb, an on/off button being coupled to the bracket, a user depressing the on/off button thereby illuminating the bulb and directing light toward the incremental markings of a dipstick.

4 Claims, 3 Drawing Sheets

DIPSTICK LIGHT ASSEMBLY

BACKGROUND OF THE INVENTION

1. Field of the Invention

The present invention relates to a dipstick light assembly and more particularly pertains to aiding the user in locating a dipstick slot in poor lighting conditions.

2. Description of the Prior Art

The use of dipsticks is known in the prior art. More specifically, dipsticks heretofore devised and utilized for the purpose of determining fluid levels are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,101,327 to Jewett discloses a dipstick locator.

U.S. Pat. No. 4,155,167 to DeLeno discloses a dipstick guide.

U.S. Pat. No. 5,025,569 to Lalevee discloses a dipstick guide, combination dipstick and dipstick holder.

U.S. Pat. No. 4,988,975 to Nap discloses a dipstick stick resistor liquid level detector with adjustable stop.

U.S. Pat. No. 4,021,924 to Haines discloses a dip stick.

U.S. Pat. No. 5,347,436 to Clyde discloses a combination baton/light emitting device.

While these devices fulfill their respective, particular objective and requirements, the aforementioned patents do not describe a dipstick light assembly for aiding the user in locating a dipstick slot in poor lighting conditions.

Therefore, it can be appreciated that there exists a continuing need for a new and improved dipstick light assembly which can be used for aiding the user in locating a dipstick slot in poor lighting conditions. In this regard, the present invention substantially fulfills this need.

SUMMARY OF THE INVENTION

In the view of the foregoing disadvantages inherent in the known types of dipsticks now present in the prior art, the present invention provides an improved dipstick light assembly. As such, the general purpose of the present invention, which will be described subsequently in greater detail, is to provide a new and improved dipstick light assembly and method which has all the advantages of the prior art and none of the disadvantages.

To attain this, the present invention is adapted for use with a dipstick formed in an elongated planar rectangular configuration with a lower end including fluid level incremental markers and an upper end including a circular loop. As best shown in FIG. 2, the circular loop resides in a plane in which the rest of the dipstick resides. The present invention includes a bracket with a disk-shaped configuration. As best shown in FIG. 6, the bracket includes a disk-shaped intermediate portion having a first predetermined diameter and a threaded bore formed centrally therein. Associated therewith is a first disk-shaped outboard portion integrally coupled in coaxial relationship with the intermediate portion. For reasons that will become apparent later, the first outboard portion has a second predetermined diameter greater than the first predetermined diameter. Also included in a second disk-shaped outboard portion with the second predetermined diameter and an aperture centrally formed therein. By this structure, the circular loop of the dipstick may be situated about the intermediate portion and the second outboard portion screwably coupled to the intermediate portion opposite the first outboard portion. Coupled to the first outboard portion of the bracket is a generally oval shaped container. The first outboard portion has a top face and a periphery defining an interior space. The container has an aperture formed in the periphery with an axis thereof aligned in parallel with the dipstick. In addition, the container further has a bore formed in the top face thereof opposite the aperture. Finally, a lighting assembly is included with a bulb situated within the aperture of the container. A pair of contacts are connected to an outer surface of the first outboard portion of the bracket within the interior space of the container. A pair of wires are each coupled between an associated contact and the bulb. For controlling the illumination of the bulb, a hollow circular button is provided with a watch battery stored therein. A pair of contacts are electrically connected to the battery and situated on a bottom face of the button. As shown in FIG. 6, the button is situated in the bore of the container and has a lowered orientation with the contacts of the button in communication with those of the bracket for illuminating the bulb, the dipstick, and a surrounding area. For precluding the illumination of the bulb, the button also has a raised orientation with the contacts of the button distant those of the bracket of the lighting assembly. A spring is situated between the first outboard face of the bracket and the button for urging the button in the raised orientation thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dipstick light assembly which has all the advantages of the prior art dipsticks and none of the disadvantages.

It is another object of the present invention to provide a new and improved dipstick light assembly which may be easily and efficiently manufactured and marketed.

It is a further object of the present invention to provide a new and improved dipstick light assembly which is of durable and reliable construction.

An even further object of the present invention is to provide a new and improved dipstick light assembly which is susceptible of a low cost of manufacture with regard to both materials and labor, and which accordingly is then susceptible of low prices of sale to the consuming public, thereby making such a dipstick light assembly economically available to the buying public.

Still yet another object of the present invention is to provide a new and improved dipstick light assembly which provides in the apparatuses and methods of the prior art some of the advantages thereof, while simultaneously overcoming some of the disadvantages normally associated therewith.

Even still another object of the present invention is to provide a new and improved dipstick light assembly for aiding the user in locating a dipstick slot in poor lighting conditions.

Lastly, it is an object of the present invention to provide a dipstick light assembly for use in association with an engine having an oil pipe with an open mouth including a dipstick formed in an elongated planar rectangular configuration with a lower end including fluid level incremental markers and an upper end. Further included is a lighting assembly situated on the upper end of the dipstick for illuminating the dipstick and a surrounding area.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
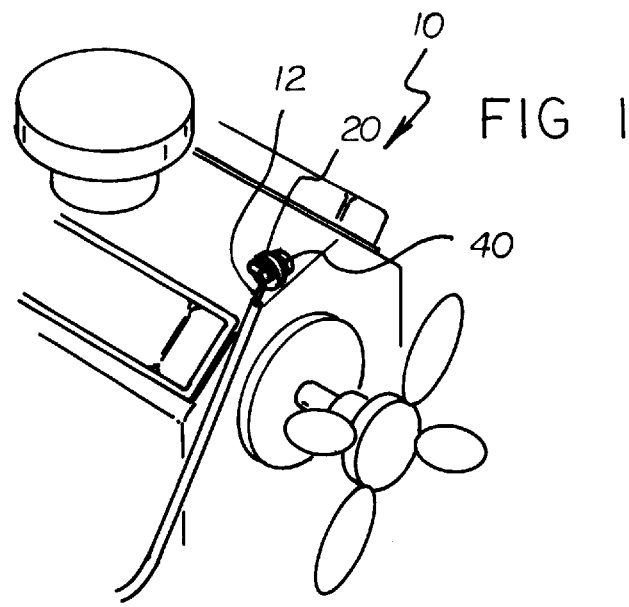
FIG. 1 is a perspective view of the preferred embodiment of the dipstick light assembly constructed in accordance with the principles of the present invention.

With reference now to the drawings, and in particular, to FIG. 1 thereof, the preferred embodiment of the new and improved dipstick light assembly embodying the principles and concepts of the present invention and generally designated by the reference number 10 will be described.

Specifically, it will be noted in the various Figures that the device relates to a dipstick light assembly 10. In its broadest context, the device consists of a bracket, a container, and a lighting assembly. Such components are individually configured and correlated with respect to each other so as to attain the desired objective.

Figure 2:
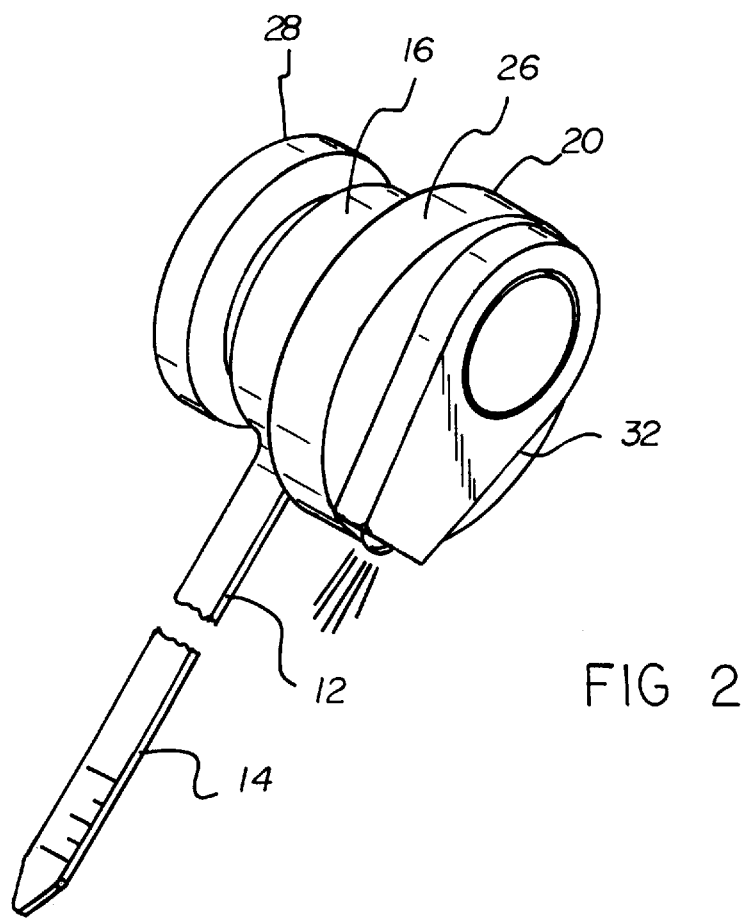
FIG. 2 is a perspective illustration of the present invention.

More specifically, the system 10 of the present invention is adapted for use with a dipstick 12 formed in an elongated planar rectangular configuration with a lower end 14 including fluid level incremental markers and an upper end 16 including a circular loop 18. As best shown in FIG. 2, the circular loop resides in a plane in which the rest of the dipstick resides.

Figure 3:
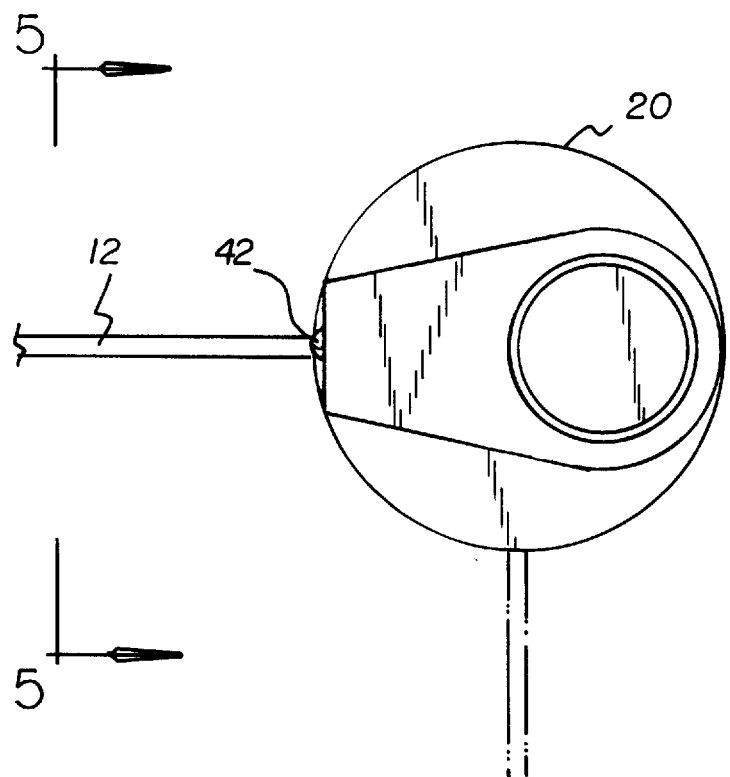
FIG. 3 is a top view of the dipstick light assembly of the present invention showing the swiveling action thereof.
Figure 4:
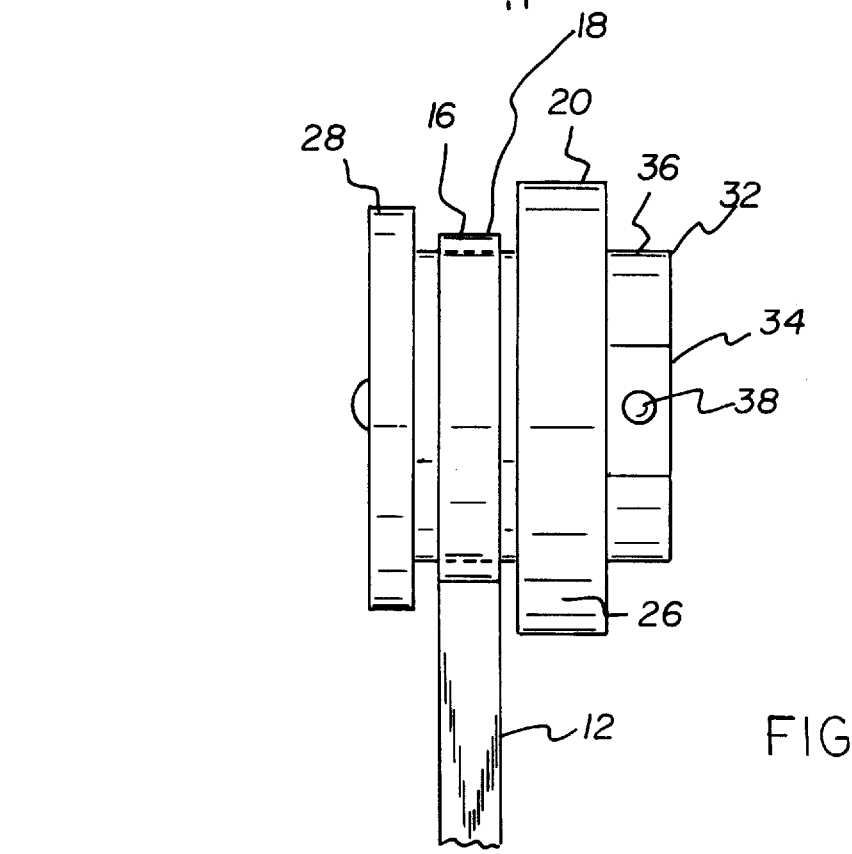
FIG. 4 is a side view of the present invention.
Figure 5:
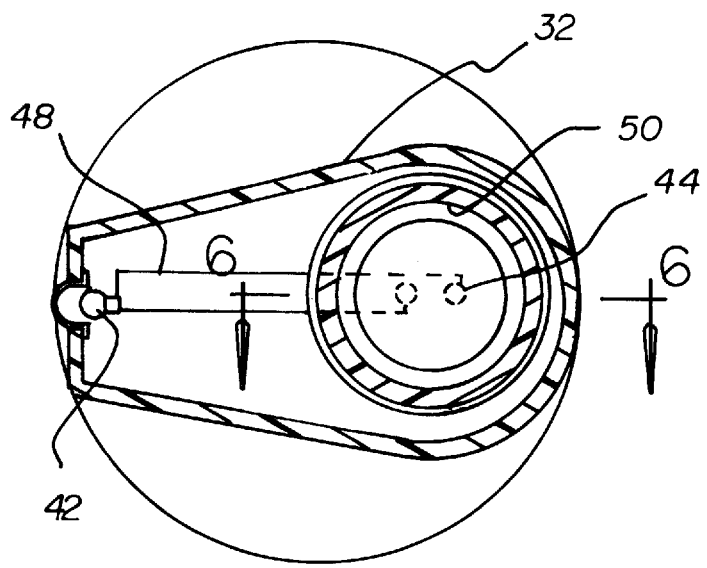
FIG. 5 is a cross-sectional view taken along line 5—5 of FIG. 3 illustrating the internal configuration of the container of the apparatus.
Figure 6:
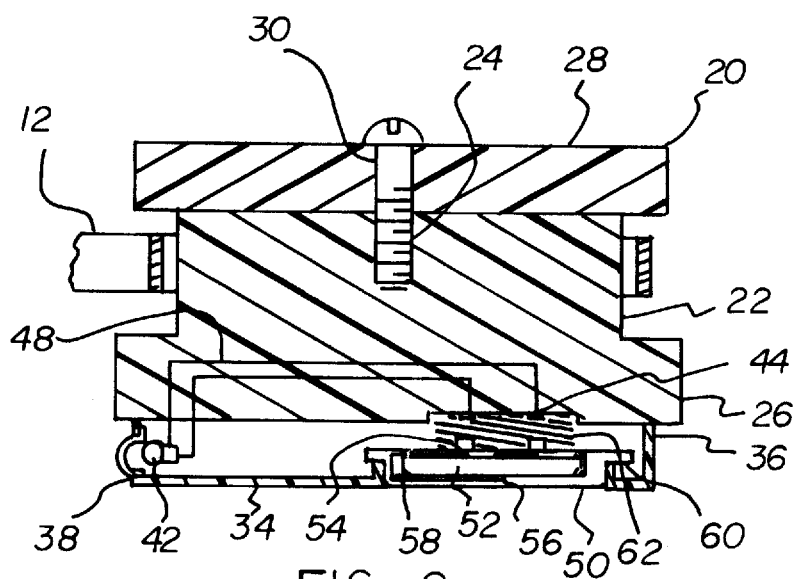
FIG. 6 is a cross-sectional view taken along line 6—6 of FIG. 5 illustrating the bracket of the present invention.

The present invention includes a bracket 20 with a disk-shaped configuration. As best shown in FIG. 6, the bracket includes a disk-shaped intermediate portion 22 having a first predetermined diameter and a threaded bore 24 formed centrally therein. Associated therewith is a first disk-shaped outboard portion 26 integrally coupled in coaxial relationship with the intermediate portion. For reasons that will become apparent later, the first outboard portion has a second predetermined diameter greater than the first predetermined diameter. Also included is a free second disk-shaped outboard portion 28 with the second predetermined diameter and an aperture 30 centrally formed therein. By this structure, the circular loop of the dipstick may be situated about the intermediate portion and the second outboard portion screwably coupled to the intermediate portion opposite the first outboard portion. As shown in FIG. 6, the circular loop of the dipstick is of a greater diameter than that of the intermediate portion of the bracket and, further, less than that of the outboard portions for allowing free swiveling of the dipstick with respect to the bracket, as shown in FIG. 3.

Coupled to the first outboard portion of the bracket is a generally oval shaped container 32. The first outboard portion has a top face 34 and a periphery 36 defining an interior space. The container has an aperture 38 formed in the periphery with an axis thereof aligned in parallel with the dipstick. In addition, the container further has a bore formed in the top face thereof opposite the aperture.

Finally, a lighting assembly 40 is included with a bulb 42 situated within the aperture of the container. A pair of contacts 44 are connected to an outer surface of the first outboard portion of the bracket within the interior space of the container. A pair of wires 48 are each coupled between an associated contact and the bulb. For controlling the illumination of the bulb, a hollow circular button 50 is provided with a watch battery 52 stored therein. A pair of spaced contacts 54 are electrically connected to the battery and situated on an exterior bottom face of the button. Such connection is afforded by a pair of interior contacts 56 coupled to the interior bottom face and top face of the interior space of the button which are, in turn, connected to the contacts 54 via miniature wires 58 situated within walls of the button. Note FIG. 6. As shown in FIG. 6, the button is situated in the bore of the container and has a lowered orientation with the contacts of the button in communication with those of the bracket for illuminating the bulb, the dipstick, and a surrounding area. For precluding the illumination of the bulb, the button also has a raised orientation with the contacts of the button distant those of the bracket of the lighting assembly. To prevent the removal of the button from the bore, an annular lip 60 extends radially outwardly form the exterior bottom face of the button. A spring 62 is situated between the first outboard face of the bracket and the button for urging the button in the raised orientation thereof. To insure that the spring is maintained in its desired location, opposed circular inset portions are formed about the contacts of the bracket and those of the button. See FIG. 6.

This apparatus is particularly useful at night, or in a garage that is not well lit. The bracket makes it easier to read the incremental markings on the dipstick, as well as making it easier to locate the oil pipe after use. Additionally, it could be used as an emergency light to check fuses, wires and to perform tire repairs.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved dipstick light assembly adapted for use in association with an engine having an oil pipe with an open mouth, the apparatus comprising, in combination:

a dipstick formed in an elongated planar rectangular configuration with a lower end including fluid level incremental markers and an upper end including a circular loop residing in a plane in which the rest of the dipstick resides;

a bracket with a disk-shaped configuration including a disk-shaped intermediate portion having a first predetermined diameter and a threaded bore formed centrally therein, a first disk-shaped outboard portion integrally coupled in coaxial relationship with the intermediate portion and having a second predetermined diameter greater than the first predetermined diameter, and a second disk-shaped outboard portion with the second predetermined diameter and an aperture centrally formed therein such that the circular loop of the dipstick is situated about the intermediate portion and the second outboard portion is screwably coupled to the intermediate portion opposite the first outboard portion;

a generally oval-shaped container integrally coupled to the first outboard portion of the bracket with a top face and a periphery defining an interior space, the container having an aperture formed in the periphery with an axis thereof aligned in parallel with the dipstick, the container further having a bore formed in the top face thereof opposite the aperture; and a lighting assembly including a bulb situated within the aperture of the container, a pair of contacts connected to an outer surface of the first outboard portion of the bracket within the interior space of the container, a pair of wires each coupled between an associated contact and the bulb, a hollow circular button with a watch battery stored therein and a pair of contacts electrically connected to the battery and situated on a bottom face of the button, wherein the button is situated in the bore of the container and has a lowered orientation with the contacts of the button in communication with those of the bracket for illuminating the bulb, the dipstick, and a surrounding area, and a raised orientation with the contacts of the button distant those of the bracket of the lighting assembly further including a spring situated between the first outboard face of the bracket and the button for urging the button in the raised orientation thereof.

2. A dipstick light assembly for use in association with an engine having an oil pipe with an open mouth, the apparatus comprising:

a dipstick formed in an elongated planar rectangular configuration with a lower end including fluid level incremental markers and an upper end;

a lighting assembly situated on the upper end of the dipstick for illuminating the dipstick and a surrounding area; and a bracket with a disk-shaped configuration including a disk-shaped intermediate portion having a first predetermined diameter and a threaded bore formed centrally therein, a first disk-shaped outboard portion integrally coupled in coaxial relationship with the intermediate portion and having a second predetermined diameter greater than the first predetermined diameter, and a second disk-shaped outboard portion with the second predetermined diameter and an aperture centrally formed therein such that a circular loop of the dipstick is situated about the intermediate portion and the second outboard portion is screwably coupled to the intermediate portion opposite the first outboard portion.

3. The dipstick light assembly as set forth in claim 2 wherein the upper end of the dipstick includes the circular loop to which the light assembly is adapted to be removably secured.

4. A dipstick light assembly as set forth in claim 2 wherein the lighting assembly includes a bulb actuated by a button which has a lowered orientation with the contacts of the button for illuminating the bulb, the dipstick, and a surrounding area and a raised orientation for precluding the illumination of the bulb, the lighting assembly further including a spring for urging the button in the raised orientation thereof.

\* \* \* \* \*